(12) United States Patent
Tsai et al.

(10) Patent No.: US 9,114,396 B2
(45) Date of Patent: Aug. 25, 2015

(54) METHOD OF MAKING FLOWCELL WITH MICRO-FLUID STRUCTURE

(71) Applicant: TAIWAN SEMICONDUCTOR MANUFACTURING COMPANY, LTD., Hsinchu (TW)

(72) Inventors: Shang-Ying Tsai, Pingzhen (TW); Jung-Huei Peng, Jhubei (TW); Li-Ming Hung, Longtan Township (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 30 days.

(21) Appl. No.: 14/156,641

(22) Filed: Jan. 16, 2014

(65) Prior Publication Data
US 2015/0196912 A1 Jul. 16, 2015

(51) Int. Cl.
| | |
|---|---|
| *H01L 21/30* | (2006.01) |
| *B01L 3/00* | (2006.01) |
| *B32B 37/12* | (2006.01) |
| *B32B 37/24* | (2006.01) |
| *B32B 38/00* | (2006.01) |
| *B32B 38/10* | (2006.01) |

(52) U.S. Cl.
CPC ....... *B01L 3/502707* (2013.01); *B32B 37/1284* (2013.01); *B32B 37/24* (2013.01); *B32B 38/0004* (2013.01); *B32B 38/10* (2013.01); *B01L 2200/12* (2013.01); *B01L 2300/0877* (2013.01); *B01L 2300/0887* (2013.01)

(58) Field of Classification Search
None
See application file for complete search history.

(56) References Cited

U.S. PATENT DOCUMENTS

2012/0004140 A1* 1/2012 Staker .......................... 506/16

* cited by examiner

*Primary Examiner* — Jack Chen
(74) *Attorney, Agent, or Firm* — Lowe Hauptman & Ham, LLP

(57) ABSTRACT

A method of making a flowcell structure, the method comprising forming a first structure, forming a second structure and bonding the first structure to the second structure. Further, forming the first structure comprises forming one or more first bio-chemicals in a first substrate and printing a first glue layer on the first substrate. Forming the second structure comprises forming one or more second bio-chemicals in a second substrate.

20 Claims, 17 Drawing Sheets

US 9,114,396 B2

METHOD OF MAKING FLOWCELL WITH MICRO-FLUID STRUCTURE

BACKGROUND

Deoxyribonucleic Acid (DNA) sequencing is a process of determining the precise order of nucleotides within a DNA molecule. DNA sequencing includes any technology or method that is used to determine the order of the four nucleobases—adenine, guanine, cytosine, and thymine—in a strand of DNA. The rapid speed of modern DNA sequencing technology has allowed the sequencing of complete DNA sequences, or genomes of numerous types and species of life, including the human genome and other complete DNA sequences of many animal, plant, and microbial species.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

Figure 1:
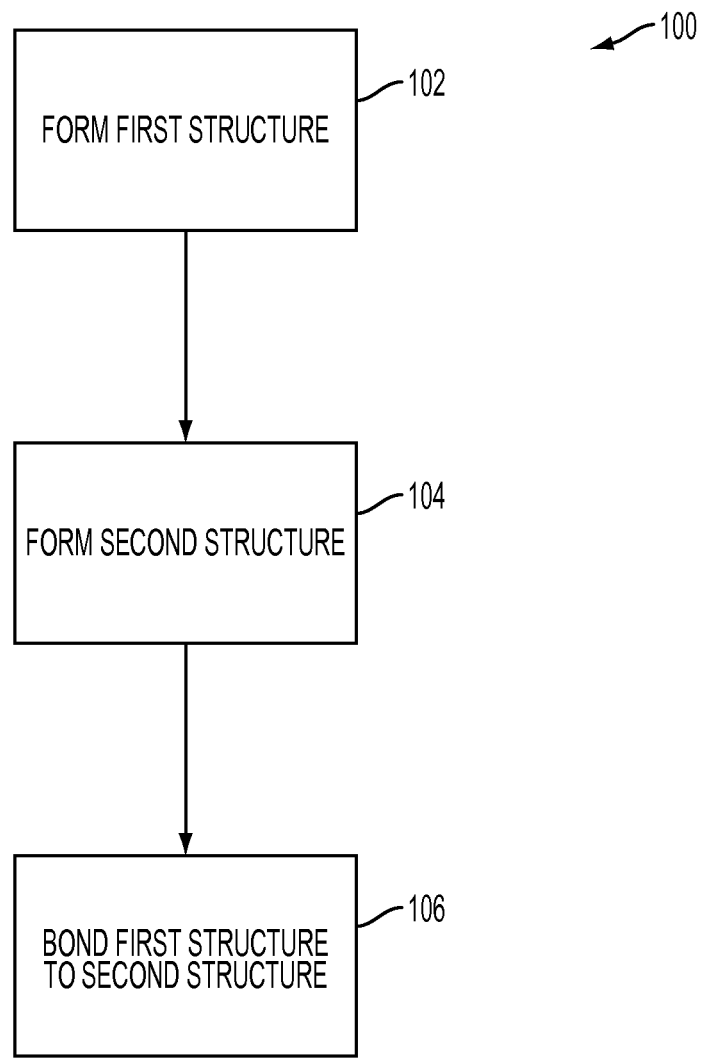
FIG. 1 is a flow chart of a method of making a device in accordance with one or more embodiments.

The following disclosure provides many different embodiments, or examples, for implementing different features of the disclosed subject matter. Specific examples of components and arrangements are described below to simplify the present disclosure. These are examples and are not intended to be limiting.

This description of the embodiments is intended to be read in connection with the accompanying drawings, which are to be considered part of the entire written description. In the description, relative terms such as "before," "after," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the system be constructed or operated in a particular orientation. Terms concerning attachments, coupling and the like, such as "connected" and "interconnected," refer to a relationship wherein components are attached to one another either directly or indirectly through intervening components, unless expressly described otherwise.

FIG. 1 is a flow chart of a method 100 of making a device 250 (shown in FIGS. 2C and 2D) in accordance with one or more embodiments. Method 100 begins with operation 102 in which a first structure 200 (shown in FIG. 2A) is formed from a first substrate 202 (shown in FIG. 2A). In some embodiments, first substrate 202 includes one or more substrates.

Figure 2A:
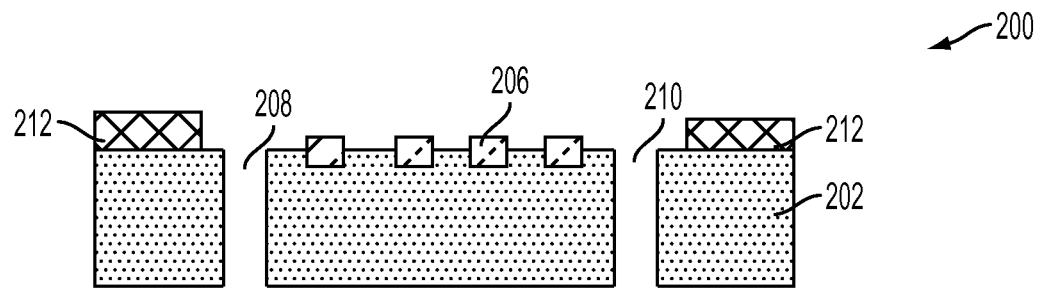
FIG. 2A is a cross sectional view of a first structure in accordance with one or more embodiments.
Figure 2B:
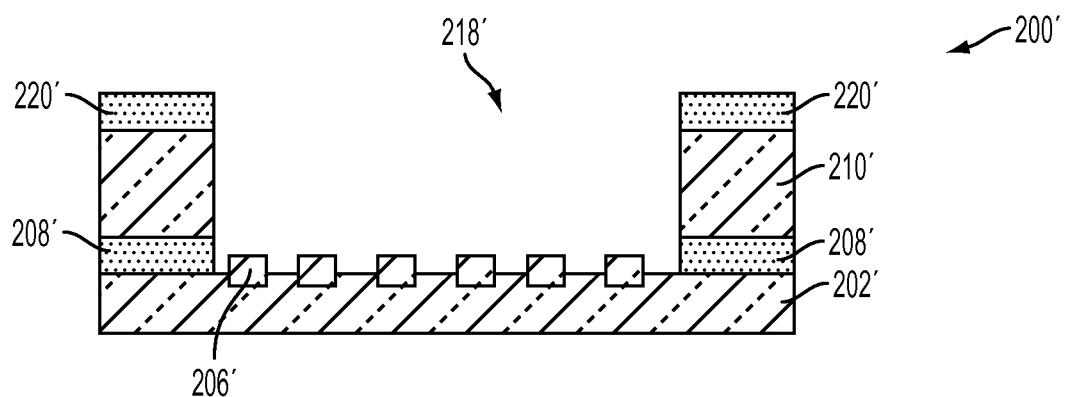
FIG. 2B is a cross sectional view of a second structure in accordance with one or more embodiments.

Method 100 continues with operation 104 in which a second structure 200' (shown in FIG. 2B) is formed from a second substrate 202' (shown in FIG. 2B). In some embodiments, second substrate 202' includes one or more substrates.

Figure 2C:
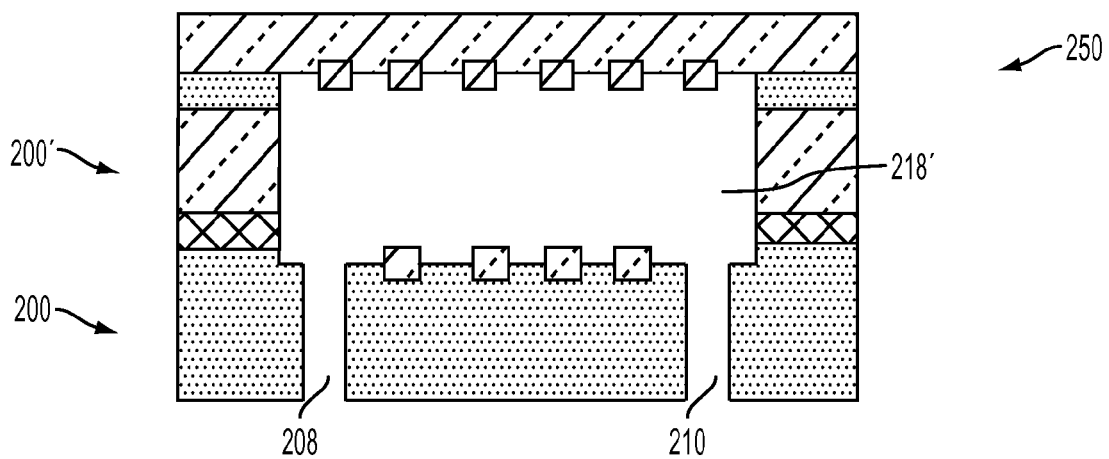
FIG. 2C is a cross sectional view of a device in accordance with one or more embodiments.
Figure 2D:
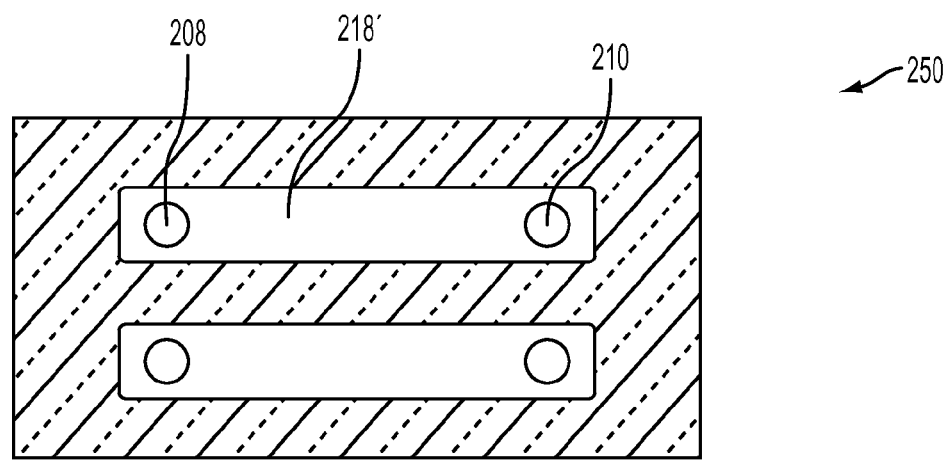
FIG. 2D is a top view of a device in accordance with one or more embodiments.

Method 100 continues with operation 106 in which the first structure 200 is bonded to the second structure 200' forming device 250 (shown in FIGS. 2C and 2D). In some embodiments, the first structure 200 is bonded to the second structure 200' using one or more adhesive layers or polymer bonding or another suitable bonding process. In some embodiments, the adhesive layer includes a first patterned glue layer 212 or a second patterned glue layer 208' (as shown in FIGS. 2A and 2B). In some embodiments, the bonding process includes a low temperature bonding process with a temperature less than or equal to 100° Celsius (C). In some embodiments, the bonding process includes a low temperature bonding process with an operating temperature ranging from about 50° C. to about 100° C. In some embodiments, device 250 includes at least one flowcell device. A flowcell device is a fluidic device used in Deoxyribonucleic Acid (DNA) sequencing. In some embodiments, DNA are attached to a flowcell by the use of a primer. In some embodiments, DNA are added to a flowcell in a random orientation. In some embodiments, DNA are added to a flowcell in a non-random orientation. In some embodiments, DNA are added to a flowcell in a grouped orientation. In some embodiments, a flowcell is used in DNA sequencing of varying read lengths or varying read options. In some embodiments, a flowcell is used in a cluster-based DNA sequencing. In some embodiments, a flowcell is used in a short-insert paired-ends sequencing. In some embodiments, a flowcell is used in a long insert mate pairs sequencing. In some embodiments, a flowcell is used in a combined paired-end and mate pairs sequencing. In some embodiments, a flowcell is used in a single read sequencing. In some embodiments, device 250 includes at least one microelectromechanical systems (MEMS) device. In some embodiments, MEMS devices include elements forming a motion sensor (for example, a gyroscope or an accelerometer, an RF MEMS device (for example, an RF switch or filter), an oscillator, a MEMS microphone, and/or any other MEMS type device, including any later developed MEMS devices. In some embodiments, device 250 includes at least one nanoelectromechanical systems (NEMS) device.

FIG. 2A is a cross-sectional view of a first structure 200 following operation 102 in accordance with one or more embodiments. First structure 200 includes a first substrate 202, bio-chemicals 206, a first opening 208, a second opening 210 and a first glue layer 212.

First substrate 202 is used to support first structure 200. In some embodiments, first substrate 202 is a transparent material including quartz, glass, a plastic polymer material (e.g., epoxy) or other suitable materials. In some embodiments, first substrate 202 is a non-transparent semiconductor material including silicon, silicon-on-insulator (SOI), silicon with defective crystallinity, diamond or other suitable materials. In some embodiments, first substrate 202 includes a compound semiconductor substrate with a multilayer structure, or the first substrate 202 includes a multilayer compound semiconductor structure. In some embodiments, a thickness of first substrate 202 ranges from about 1500 microns ($\mu$m) to about 2000 $\mu$m.

Bio-chemicals 206 are formed in a top surface of the first substrate 202. In some embodiments, bio-chemicals 206 are formed in patterned well openings (not shown in FIG. 2A). In some embodiments, bio-chemicals 206 are positioned in a two-dimensional plane which is parallel to first substrate 202. In some embodiments, bio-chemicals 206 are a three-dimensional structure partially embedded in first substrate 202. In some embodiments, bio-chemicals 206 are formed in one or more regions in first substrate 202. In some embodiments, bio-chemicals 206 include a base adhesive for bio-primers. In some embodiments, a bio-primer is a strand of nucleic acid that functions as a starting point for DNA synthesis. In some embodiments, bio-chemicals 206 allow a bio-entity cluster which includes multiple identical DNA strands to be grouped together for DNA sequencing. In some embodiments, bio-chemicals 206 include hydrogel-based materials. In some embodiments, bio-chemicals 206 are placed in patterned well openings by Illumina BeadArray Technology™. In some embodiments, bio-chemicals 206 are placed in patterned well openings by 454 Sequencing™.

First opening 208 or second opening 210 are formed in first substrate 202. In some embodiments, first opening 208 or second opening 210 are shaped in various patterns, such as rectangular, square, circular, hexagonal, or other geometric shapes. In some embodiments, first opening 208 and second opening 210 are substantially the same size. In some embodiments, first opening 208 and second opening 210 are substantially a different size. In some embodiments, a diameter of the first opening 208 ranges from about 300 $\mu$m to about 2 mm. In some embodiments, a diameter of the second opening 210 ranges from about 300 $\mu$m to about 2 mm. In some embodiments, the diameter of the first opening 208 or the diameter of the second opening 210 is varied based upon the design of the first opening 208 or second opening 210. In some embodiments, first opening 208 is a fluid inlet and second opening 210 is a fluid outlet in a flowcell device. In some embodiments, first opening 208 is a fluid outlet and second opening 210 is a fluid inlet in a flowcell device.

First glue layer 212 is formed on a top surface of first substrate 202. In some embodiments, first glue layer 212 includes one or more layers. In some embodiments, first glue layer 212 is positioned in a two-dimensional plane which is parallel to first substrate 202. In some embodiments, first glue layer 212 is formed on one or more regions of the first substrate 202. In some embodiments, first glue layer 212 is formed along an edge of the top surface of the first substrate 202. In some embodiments, first glue layer 212 includes an adhesive resin (including Epoxy, glue, polyimide/rubber based glues, acrylic-based glues, silicone-based glues, epoxy-based polymer/resin or other suitable materials). In some embodiments, a width of the first glue layer 212 is equal to 5 $\mu$m or greater than 5 $\mu$m. In some embodiments, a thickness of the first glue layer 212 ranges from about 0.15 $\mu$m to about 15 $\mu$m. In some embodiments, first glue layer 212 is optional (for the embodiments shown in FIG. 8). In some embodiments, first glue layer 212 is alkali-resistant at pH 11 or greater. In some embodiments, first glue layer 212 is bio-compatible/friendly. In some embodiments, first glue layer 212 is not soluble in water or an alcohol base solution.

FIG. 2B is a cross-sectional view of a second structure 200' following operation 104 in accordance with one or more embodiments. Second structure 200' includes a second substrate 202', bio-chemicals 206', second glue layer 208', base film 210', channel region 218' and third glue layer 220'.

Second substrate 202' is used to support second structure 200'. In some embodiments, second substrate 202' is a transparent material including quartz, glass, a plastic polymer material (e.g., epoxy or acrylic) or other suitable materials. In some embodiments, second substrate 202' is a non-transparent semiconductor material including silicon, silicon-on-insulator (SOI), silicon with defective crystallinity, diamond or other suitable materials. In some embodiments, second substrate 202' includes a compound semiconductor substrate with a multilayer structure, or the second substrate 202' includes a multilayer compound semiconductor structure. In some embodiments, a thickness of second substrate 202' ranges from about 1500 $\mu$m to about 2000 $\mu$m.

Bio-chemicals 206' are formed in a top surface of the second substrate 202'. In some embodiments, bio-chemicals 206' are formed in patterned well openings (not shown in FIG. 2B). In some embodiments, bio-chemicals 206' are positioned in a two-dimensional plane which is parallel to second substrate 202'. In some embodiments, bio-chemicals 206' are a three-dimensional structure partially embedded in second substrate 202'. In some embodiments, bio-chemicals 206' are formed in one or more regions in second substrate 202'. In some embodiments, bio-chemicals 206' include a base adhesive for bio-primers. In some embodiments, a bio-primer is a strand of nucleic acid that functions as a starting point for DNA synthesis. In some embodiments, bio-chemicals 206' allow a bio-entity cluster which includes multiple identical DNA strands to be grouped together for DNA sequencing. In some embodiments, bio-chemicals 206' include hydrogel-based materials. In some embodiments, bio-chemicals 206' are placed in patterned well openings by Illumina BeadArray Technology™. In some embodiments, bio-chemicals 206' are placed in patterned well openings by 454 Sequencing™.

Second glue layer 208' is formed on a top surface of second substrate 202'. In some embodiments, second glue layer 208' includes one or more layers. In some embodiments, second glue layer 208' is positioned in a two-dimensional plane which is parallel to second substrate 202'. In some embodiments, second glue layer 208' is formed on one or more regions of the second substrate 202'. In some embodiments, second glue layer 208' is formed along an edge of the top surface of the second substrate 202'. In some embodiments, second glue layer 208' includes an adhesive resin (including Epoxy, glue polyimide/rubber based glues, acrylic-based glues, silicone-based glues, epoxy-based polymer/resin or other suitable materials). In some embodiments, a width of the second glue layer 208' is equal to 5 $\mu$m or greater than 5 $\mu$m. In some embodiments, a thickness of the second glue layer 208' ranges from about 0.15 $\mu$m to about 15 $\mu$m. In some embodiments, second glue layer 208' is the same material as first glue layer 212. In some embodiments, second glue layer 208' is alkali-resistant at pH 11 or greater. In some embodiments, second glue layer 208' is bio-compatible/friendly. In some embodiments, second glue layer 208' is not soluble in water or an alcohol base solution.

Base film 210' is placed on second glue layer 208'. In some embodiments, base film 210' is substantially flush against second glue layer 208'. In some embodiments, base film 210' partially covers second glue layer 208'. In some embodiments, base film 210' is positioned in a two-dimensional plane which is parallel to second substrate 202'. In some embodiments, base film 210' includes one or more portions placed on the second substrate 202'. In some embodiments, base film 210' includes one or more layers. In some embodiments, base film 210' is placed on one or more regions of the second substrate 202'. In some embodiments, base film 210' includes a polymer material including polyethylene terephthalate (PET), polypropene (PP), polythene (PE), polyimide (PI), rubber-based, acrylic-based (PMMA), silicone-based, epoxy-based polymer/resin or other suitable materials. In some embodiments, base film 210' includes a non-adhesive material. In some embodiments, a width of the base film 210' is equal to 20 μm or greater than 20 μm. In some embodiments, a thickness of the base film 210' ranges from about 40 μm to about 200 μm. In some embodiments, base film 210' is alkali-resistant at pH 11 or greater. In some embodiments, base film 210' is bio-compatible/friendly. In some embodiments, base film 210' is not soluble in water or an alcohol base solution.

Channel region 218' is formed in base film 210'. In some embodiments, channel region 218' is shaped in various patterns, such as rectangular, square, circular, hexagonal, or other geometric shapes. In some embodiments, a width of the channel region 218' is substantially equal to 20 um or greater than 20 um. In some embodiments, channel region 218' is a fluid channel in a flowcell device.

Third glue layer 220' is formed on a top surface of base film 210'. In some embodiments, third glue layer 220' includes one or more layers. In some embodiments, third glue layer 220' is positioned in a two-dimensional plane which is parallel to second substrate 202'. In some embodiments, third glue layer 220' is formed on one or more regions of the base film 210'. In some embodiments, third glue layer 220' partially covers base film 210'. In some embodiments, third glue layer 220' includes an adhesive resin (including Epoxy, glue polyimide/rubber based glues, acrylic-based glues, silicone-based glues, epoxy-based polymer/resin or other suitable materials). In some embodiments, a width of the third glue layer 220' is equal to or greater than 5 μm. In some embodiments, a thickness of the third glue layer 220' ranges from about 0.5 μm to about 15 μm. In some embodiments, third glue layer 220' is optional (for some of the embodiments shown in FIG. 5). In some embodiments, third glue layer 220' is the same material as second glue layer 208' or first glue layer 212. In some embodiments, third glue layer 220' is alkali-resistant at pH 11 or greater. In some embodiments, third glue layer 220' is bio-compatible/friendly. In some embodiments, third glue layer 220' is not soluble in water or an alcohol base solution.

FIG. 2C is a cross-sectional view of a device 250 following operation 106 in accordance with one or more embodiments. Device 250 is an embodiment of first structure 200 bonded to second structure 200' with similar elements. As shown in FIG. 2C, similar elements have a same reference number as shown in FIGS. 2A and 2B. Device 250 includes channel region 218' formed between first structure 200 and second structure 200'. In some embodiments, device 250 includes one or more channel regions 218'. In some embodiments, the channel region 218' has a thickness of at least 1 μm or greater. In some embodiments, device 250 includes a flowcell device.

FIG. 2D is a top view of the device 250 following operation 106 in accordance with one or more embodiments. In some embodiments, device 250 includes one or more channel regions 218'.

Figure 3:
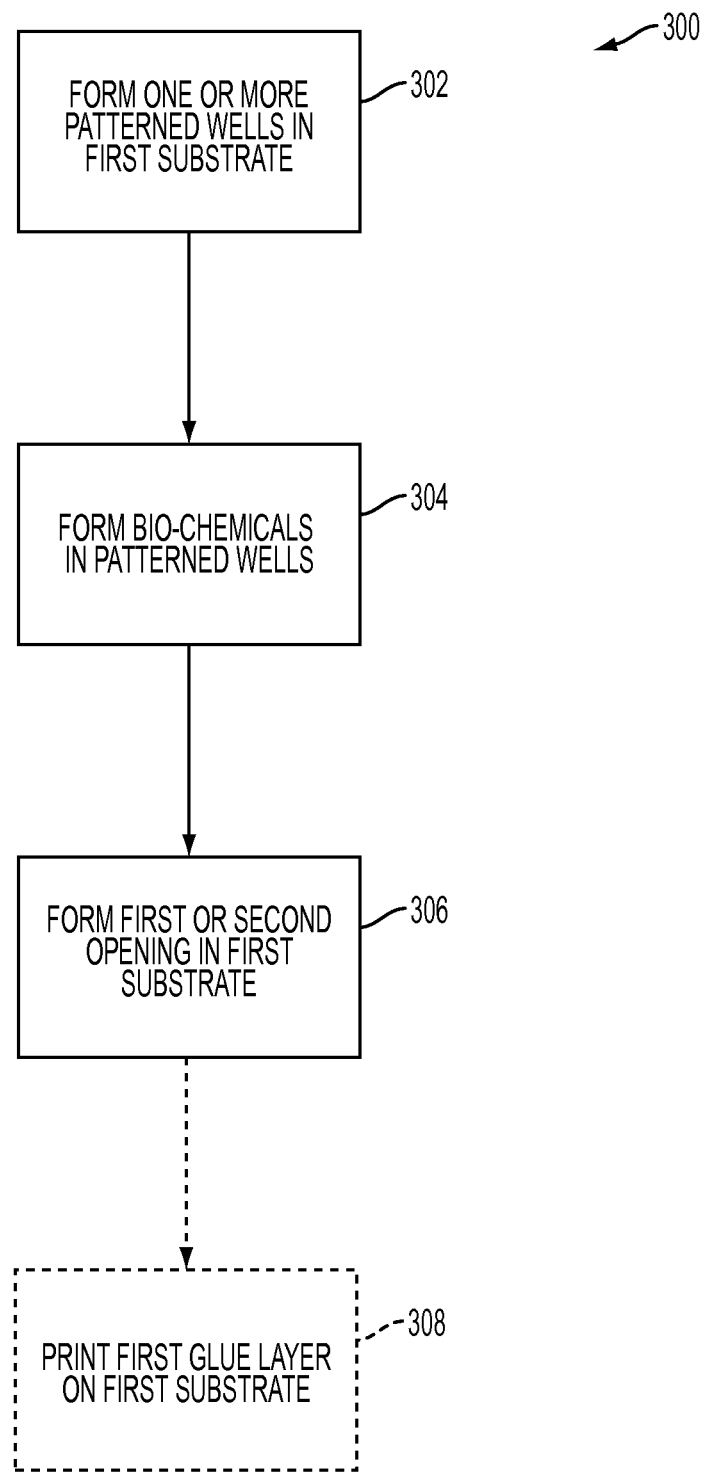
FIG. 3 is a flow chart of a method of making a first structure in accordance with one or more embodiments.

FIG. 3 is a flow chart of a method 300 of making a first structure 200 in accordance with one or more embodiments. Method 300 begins with operation 302 in which one or more patterned wells 404 (shown in FIG. 4B) are formed in a first substrate 202. In some embodiments, the patterned wells are formed in the first substrate 202 using a Complementary Metal Oxide Semiconductor (CMOS) process or other suitable process.

In some embodiments, the CMOS process includes forming a photoresist over the first substrate 202, patterning the photoresist, and forming openings (e.g., patterned wells 404) in the first substrate 202 by etching the photoresist. In some embodiments, a photoresist is formed over the first substrate 202. In some embodiments, the photoresist is formed by a spin-on process, a physical vapor deposition (PVD) process or another suitable formation process. One of ordinary skill in the art will appreciate that various photoresist thicknesses are able to be achieved by using different types of photoresist materials or by varying the spin speed used during formation of the photoresist. In some embodiments, the photoresist includes a positive photoresist material. In some embodiments, the photoresist includes a negative photoresist material. In some embodiments, additional layers such as anti-reflective (AR) coatings, hard mask layer, or other suitable layers are formed between the photoresist and the first substrate 202. In some embodiments, photoresist includes a positive or negative photoresist material. In some embodiments, using a positive photoresist reduces thermal expansion or shrinkage in comparison with a negative photoresist. The reduced thermal expansion or shrinkage helps to improve control. After the photoresist is deposited on the first substrate 202, the photoresist is patterned. In some embodiments, the photoresist is patterned using a photolithography process. In some embodiments, the photolithography process uses UV light to pattern the photoresist. The photolithography light causes exposed portions of the photoresist to become more soluble to a developer solution, while portions of the photoresist remain insoluble to the developer solution. The developer solution is then used to remove the more soluble areas leaving the patterned photoresist with a structure having openings therein. In some embodiments, multiple sets of openings (e.g., patterned wells 404) are formed. In some embodiments, each set of openings formed in the photoresist are formed simultaneously. In some embodiments, at least one set of openings is formed subsequent to at least another set of openings. In some embodiments, the openings in the first substrate 202 are formed by an etching process, such as a dry etching process, a wet etching process, a reactive ion etching (RIE) etching process, a plasma-assisted etching process or another suitable material removal process. In some embodiments, the photoresist is removed during the etching process. In some embodiments, the patterned photoresist is removed in a process subsequent to the etching process.

In some embodiments, the patterned wells 404 include one or more via openings formed partially through first substrate 202. In some embodiments, patterned wells 404 are shaped in various patterns, such as rectangular, square, circular, hexagonal, or other geometric shapes. In some embodiments, each patterned well 404 is substantially the same size as one another. In some embodiments, each patterned well 404 is substantially a different size as one another. In some embodiments, a diameter of each patterned well 404 independently ranges from about 0.1 μm to about 5 μm. In some embodiments, a depth of each patterned well 404 independently ranges from about 0.05 μm to about 10 μm. In some embodiments, a ratio of the diameter of a patterned well 404 to a depth of the same patterned well 404 ranges from about 0.5 to about 2. In some embodiments, for a diameter of patterned well 404 of about 0.1 μm, a depth of each patterned well 404 ranges from about 0.05 μm to about 0.2 μm. In some embodiments, for a diameter of patterned well 404 of about 5 µm, a depth of each patterned well 404 ranges from about 2.5 µm to about 10 µm.

Method 300 continues with operation 304 in which bio-chemicals 206 are formed in patterned wells 404. In some embodiments, bio-chemicals 206 are placed in patterned wells 404 by Illumina BeadArray Technology™. In some embodiments, bio-chemicals 206 are placed in patterned wells 404 by 454 Sequencing™. In some embodiments, bio-chemicals 206 completely fill each of the openings in patterned wells 404. In some embodiments, bio-chemicals 206 partially fill each of the openings in patterned wells 404. In some embodiments, bio-chemicals 206 are partially embedded in first substrate 202.

Method 300 continues with operation 306 in which the first opening 208 or second opening 210 are formed in the first substrate 202. In some embodiments, the first opening 208 or second opening 210 are formed using a laser drilling process. In some embodiments, the laser drilling process includes a Fluorine 2 (F2) laser having a wavelength of about 157 nm. In some embodiments, the laser drilling process includes an Argon Fluoride (ArF) laser having a wavelength of about 193 nm. In some embodiments, the laser drilling process includes a Krypton Fluoride (KrF) laser having a wavelength of about 248 nm. In some embodiments, the laser drilling process includes a Xenon monoChloride (XeCl) laser having a wavelength of about 308 nm. In some embodiments, the laser drilling process includes a Xenon Fluoride (XeF) laser having a wavelength of about 351 nm. In some embodiments, the laser drilling process includes a Diode-Pumped Solid State (DPSS) laser having a wavelength of about 355 nanometer (nm) or less. In some embodiments, the laser drilling process includes a source power ranging from about 10.0 Watts or less. In some embodiments, the laser drilling process includes a repetition rate of about 30 KHz. In some embodiments, first substrate 202 is attached to a carrier structure (not shown) for method 300. In some embodiments, the first opening 208 or second opening 210 are formed using a sand blasting process. In some embodiments, the first opening 208 or second opening 210 are formed using a plasma dry etching process followed by a grinding and polishing. In some embodiments, the grinding and polishing are performed by chemical mechanical polishing (CMP).

Method 300 continues with operation 308 in which the first glue layer 212 is printed directly on the first substrate 202. In some embodiments, the first glue layer 212 is printed using a jet printer process/tool. In some embodiments, a jet printer process includes a mist generation stage, an aerodynamic focusing stage and a deposition stage. In some embodiments, the mist generation stage includes ultrasonic and pneumatic atomizers using small aerosol droplets (e.g., 1 µm to about 5 µm). In some embodiments, the aerodynamic focusing stage includes the introduction of sheath gas where the aerosol droplets are surrounded with annual, co-axial flow and approach the speed of sound. In some embodiments, the deposition stage deposits the first glue layer 212 on the first substrate 202 using a tightly focused, high density stream to produce 10 µm to about 5 cm line widths with excellent edge definition. In some embodiments, the first glue layer 212 is printed using a jet printer process for a thickness less than 100 µm. In some embodiments, the first glue layer 212 is printed using an inkjet printer tool/process. In some embodiments, an inkjet printer tool includes a contactless method for microscale printing. In some embodiments, an inkjet printer tool generates liquid droplets ranging from about 20 µm to about 200 µm on demand. In some embodiments, the inkjet printer tool uses a SU-8 Photoepoxy™ by Gersteltec. In some embodiments, the first glue layer 212 is printed using a conventional ultra-fine pattern screen printing tool/process. In some embodiments, a screen printing tool comprises an adhesive paste that is emulsified through an ultra-fine screen mesh with a squeegee and is subsequently deposited onto an underlying substrate. In some embodiments, the first glue layer 212 is optional where the second glue layer 208' and the third glue layer 220' are a double-sided adhesive layer (shown in FIG. 8). In some embodiments, the first glue layer 212 is optional where the second glue layer 208' and the third glue layer 220' are on the top and bottom surfaces of the base film 210' (shown in FIG. 5).

Figure 4A:
FIGS. 4A-4E are cross sectional views of a first structure during various stages of production in accordance with one or more embodiments.

FIG. 4A is a cross-sectional view of a first structure 400 before operation 302 in accordance with one or more embodiments. First structure 400 is an embodiment of first structure 200 with similar elements. As shown in FIG. 4A, similar elements have a same reference number as shown in FIG. 2A.

Figure 4B:
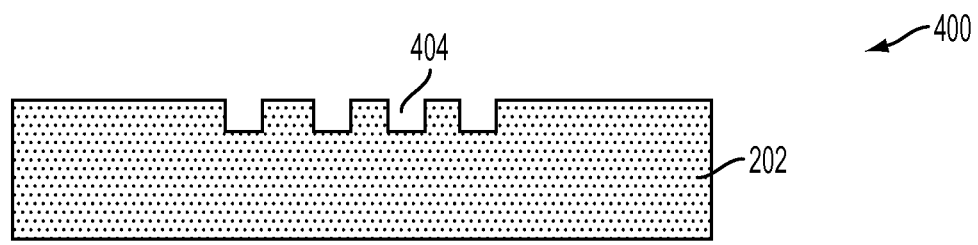

FIG. 4B is a cross-sectional view of first structure 400 following operation 302 in accordance with one or more embodiments. First structure 400 includes one or more patterned wells 404 formed in an upper surface of the first substrate 202.

Figure 4C:
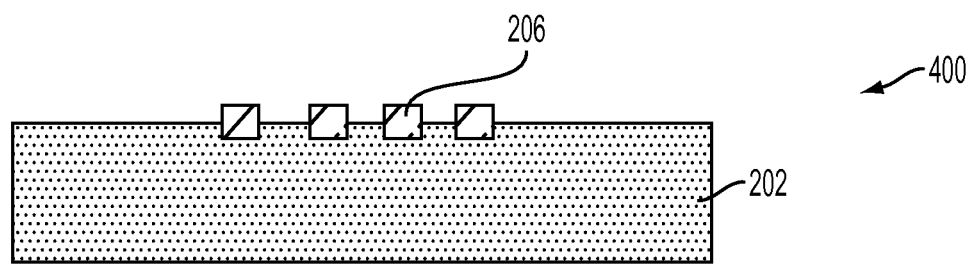

FIG. 4C is a cross-sectional view of first structure 400 following operation 304 in accordance with one or more embodiments. First structure 400 includes one or more bio-chemicals 206 formed in patterned wells 404.

Figure 4D:
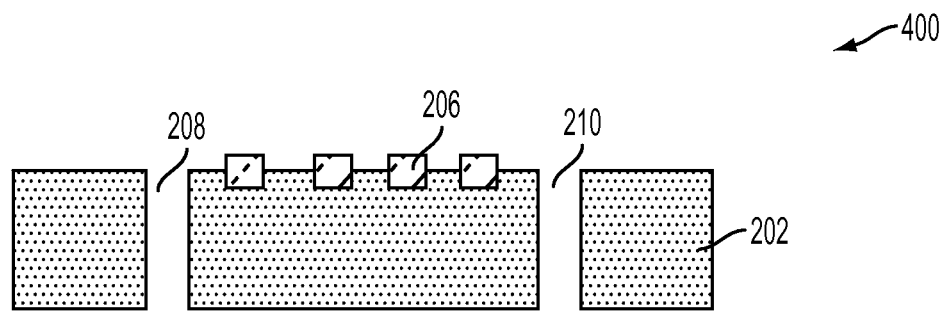

FIG. 4D is a cross-sectional view of first structure 400 following operation 306 in accordance with one or more embodiments. First structure 400 includes first opening 208 and second opening 210 formed in first substrate 202.

Figure 4E:
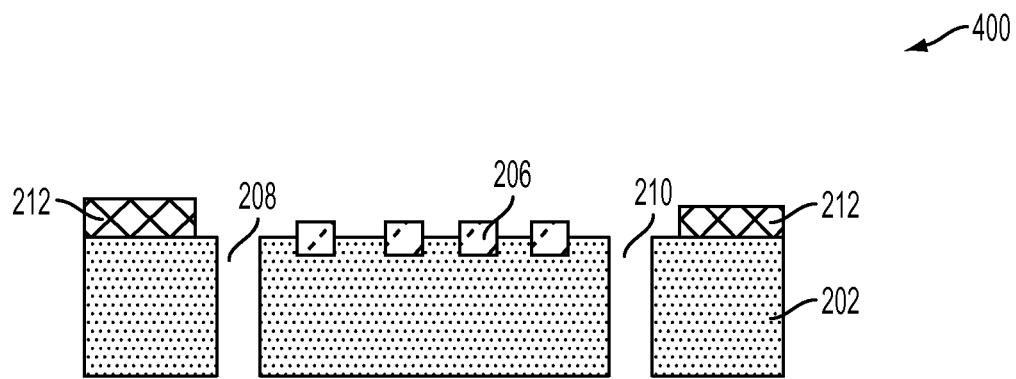

FIG. 4E is a cross-sectional view of first structure 400 following operation 308 in accordance with one or more embodiments. First structure 400 includes first glue layer 212 formed on first substrate 202. First structure 400 is an embodiment of first structure 200 shown in FIG. 2A with similar elements.

Figure 5:
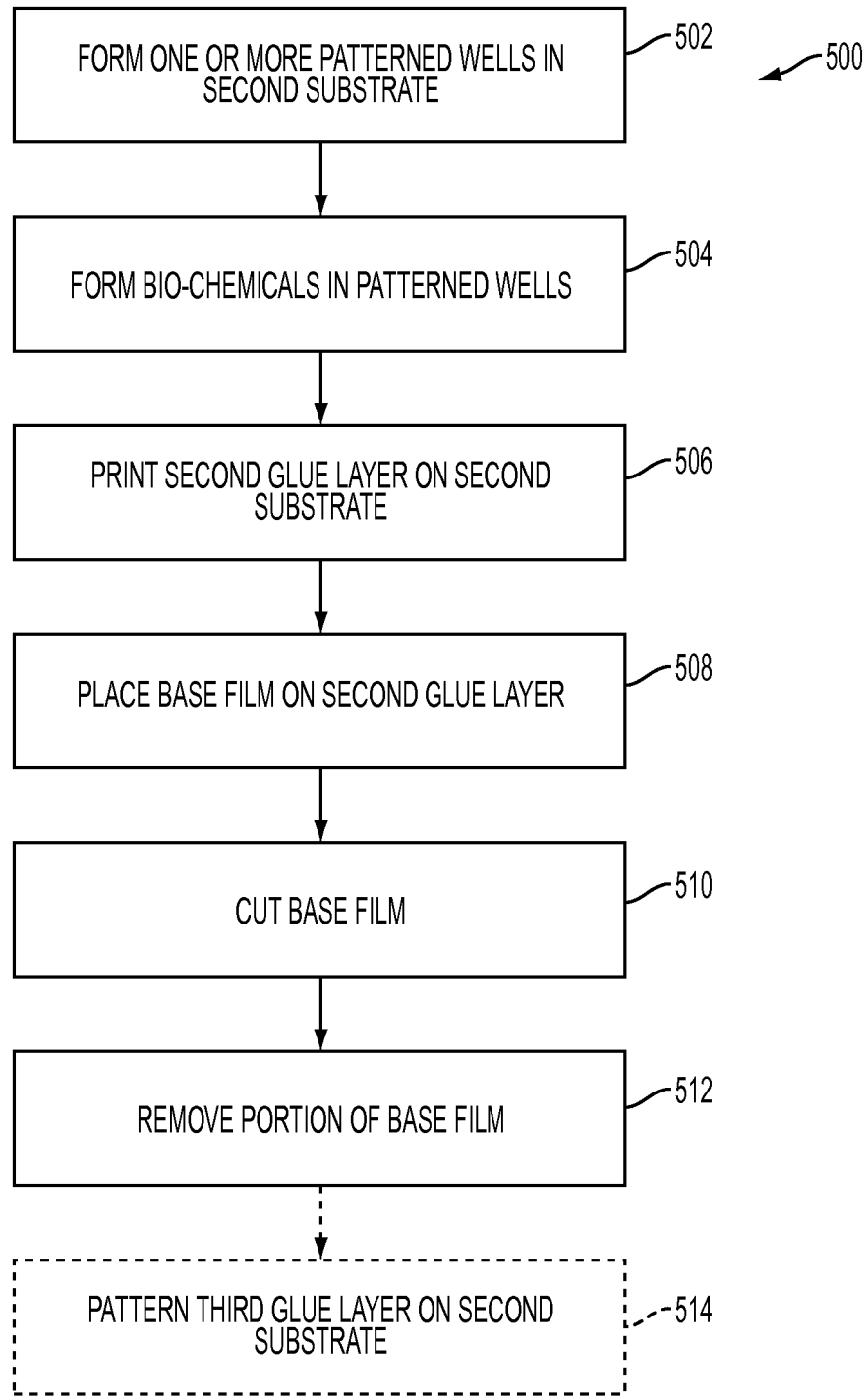
FIG. 5 is a flow chart of a method of making a second structure in accordance with one or more embodiments.

FIG. 5 is a flow chart of a method 500 of making a second structure 200' in accordance with one or more embodiments. Method 500 begins with operation 502 in which one or more patterned wells 604 (shown in FIG. 6B) are formed in a second substrate 202'. Patterned wells 604 are an embodiment of the patterned wells 404 shown in FIG. 4B.

Method 500 continues with operation 504 in which bio-chemicals 206' are formed in patterned wells 604. In some embodiments, bio-chemicals 206' are placed in patterned wells 604 by Illumina BeadArray Technology™. In some embodiments, bio-chemicals 206' are placed in patterned wells 604 by 454 Sequencing™. In some embodiments, bio-chemicals 206' completely fill each of the openings in patterned wells 604. In some embodiments, bio-chemicals 206' partially fill each of the openings in patterned wells 604. In some embodiments, bio-chemicals 206' are partially embedded in second substrate 202'. In some embodiments, bio-chemicals 206' are substantially similar to the bio-chemicals 206 formed in patterned wells 404.

Method 500 continues with operation 506 in which the second glue layer 208' is printed directly on the second substrate 202'. In some embodiments, the second glue layer 208' is printed using a jet printer process/tool, where the jet printer process/tool described in operation 506 is an embodiment of the jet printer process/tool described in operation 306. In some embodiments, the second glue layer 208' is printed using an inkjet printer tool/process, where the inkjet printer tool/process described in operation 506 is an embodiment of the inkjet printer tool/process described in operation 306. In some embodiments, the second glue layer 208' is printed using a conventional ultra-fine pattern screen printing tool/ process, where the screen printing tool/process described in operation 506 is an embodiment of the screen printing tool/process described in operation 306. In some embodiments, the first glue layer 212 (described in operation 308) is optional where the second glue layer 208' (shown in operation 506) is on the bottom surface of the base film 210' and the third glue layer 220' (shown in operation 514) is on the top surface of the base film 210'.

Method 500 continues with operation 508 in which a base film 602 is placed on the second glue layer 208'. In some embodiments, base film 602 is substantially flush against second glue layer 208'. In some embodiments, base film 602 is not in contact with second substrate 202' or bio-chemicals 206', and prevents any damage to the bio-chemicals 206' formed in the patterned wells 604. Base film 602 includes base film 210' and region 610.

Method 500 continues with operation 510 in which the base film 602 is cut in one or more regions. In some embodiments, base film 602 is cut at first cut region 612 or second cut region 614. In some embodiments, after base film 602 is cut, a region 610 (shown in FIG. 6F) of base film 602 is formed. In some embodiments, region 610 is a central portion of the base film 602. In some embodiments, first cut region 612 or second cut region 614 is substantially orthogonal to second substrate 202'. In some embodiments, first cut region 612 is substantially parallel to second cut region 614. In some embodiments, base film 602 is cut using a laser cutting process. In some embodiments, the laser cutting process includes a scribe width of about 10 µm with a low heat affect zone for a cut region with a thickness of about 25 µm. In some embodiments, the laser cutting process includes a scribe width of about 90 µm with a heat affect zone of about 100 µm for a cut region with a thickness of about 300 µm. In some embodiments, the laser cutting process includes a Fluorine 2 (F2) laser having a wavelength of about 157 nm. In some embodiments, the laser cutting process includes an Argon Fluoride (ArF) laser having a wavelength of about 193 nm. In some embodiments, the laser cutting process includes a Krypton Fluoride (KrF) laser having a wavelength of about 248 nm. In some embodiments, the laser cutting process includes a Xenon monoChloride (XeCl) laser having a wavelength of about 308 nm. In some embodiments, the laser cutting process includes a Xenon Fluoride (XeF) laser having a wavelength of about 351 nm.

Method 500 continues with operation 512 in which a portion of the base film 602 is removed. In some embodiments, region 610 of the base film 602 is removed by a removal device 616 (shown in FIG. 6G). In some embodiments, after region 610 of the base film 602 is removed, base film 210' remains attached to the second substrate 202'. In some embodiments, after region 610 is removed, channel region 218' is formed. In some embodiments, removal device 616 includes a de-laminator. In some embodiments, removal device 616 includes an adhesive material formed on a surface of a cylindrically-shaped rod which is rolled along the surface of region 610 to remove region 610 from base film 602. In some embodiments, removal device 616 includes an adhesive material (or other suitable materials) which is used to remove region 610 from base film 602.

Method 500 continues with operation 514 in which the third glue layer 220' is printed directly on the top surface of the remaining base film 210'. In some embodiments, the third glue layer 220' is printed using a jet printer process/tool, where the jet printer process/tool described in operation 514 is an embodiment of the jet printer process/tool described in operation 306. In some embodiments, the third glue layer 220' is printed using an inkjet printer tool/process, where the inkjet printer tool/process described in operation 514 is an embodiment of the inkjet printer tool/process described in operation 306. In some embodiments, the third glue layer 220' is printed using a conventional ultra-fine pattern screen printing tool/process, where the screen printing tool/process described in operation 514 is an embodiment of the screen printing tool/process described in operation 306. In some embodiments, the third glue layer 220' is optional where the first glue layer 212 is deposited on the top surface of the first substrate 202 (described in operation 308) and the second glue layer 208' is deposited on the top surface of the second substrate 202'. In some embodiments, the first glue layer 212 (described in operation 308) is optional where the second glue layer 208' (shown in operation 506) and the third glue layer 220' (shown in operation 514) are on the top and bottom surfaces of the base film 210'.

Figure 6A:
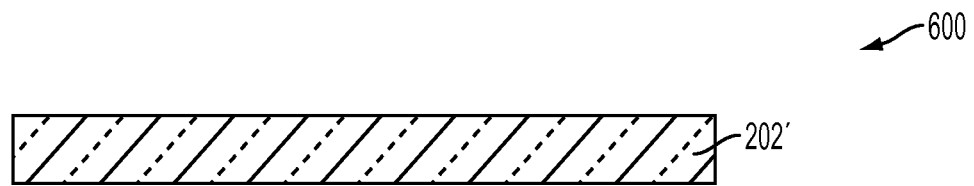
FIGS. 6A-6I are cross sectional views of a second structure during various stages of production in accordance with one or more embodiments.

FIG. 6A is a cross-sectional view of a second structure 600 before operation 502 in accordance with one or more embodiments. Second structure 600 is an embodiment of second structure 200' with similar elements. As shown in FIG. 6A, similar elements have a same reference number as shown in FIG. 2B.

Figure 6B:
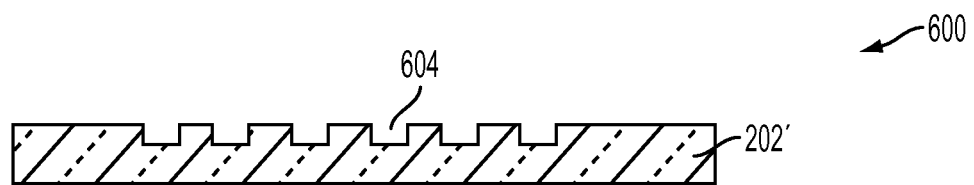

FIG. 6B is a cross-sectional view of second structure 600 following operation 502 in accordance with one or more embodiments. Second structure 600 includes one or more patterned wells 604 formed in an upper surface of the second substrate 202'.

Figure 6C:
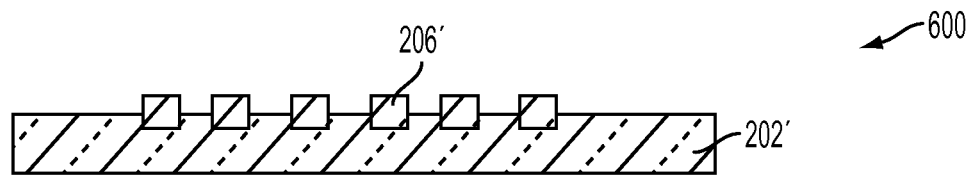

FIG. 6C is a cross-sectional view of second structure 600 following operation 504 in accordance with one or more embodiments. Second structure 600 includes one or more bio-chemicals 206' formed in patterned wells 604.

Figure 6D:
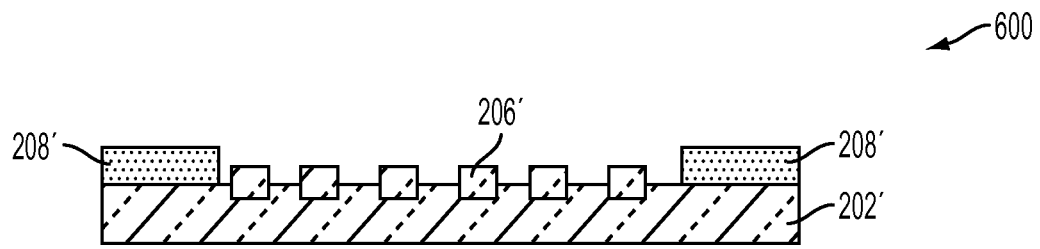

FIG. 6D is a cross-sectional view of second structure 600 following operation 506 in accordance with one or more embodiments. Second structure 600 includes second glue layer 208' formed on second substrate 202'.

Figure 6E:
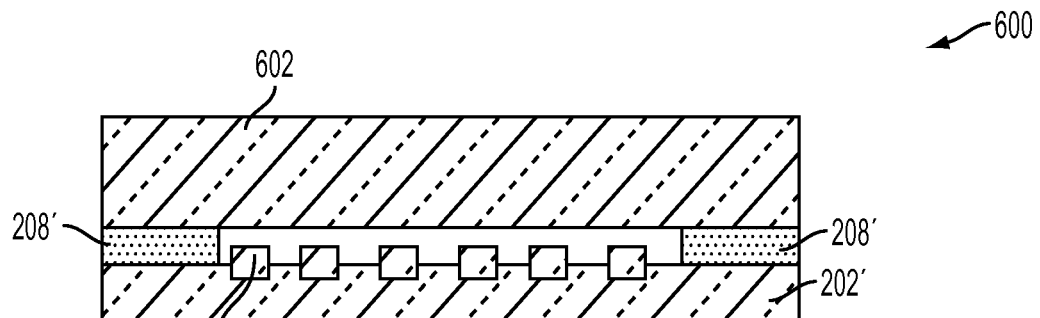

FIG. 6E is a cross-sectional view of second structure 600 following operation 508 in accordance with one or more embodiments. Second structure 600 includes base film 602 placed on second glue layer 208'.

Figure 6F:
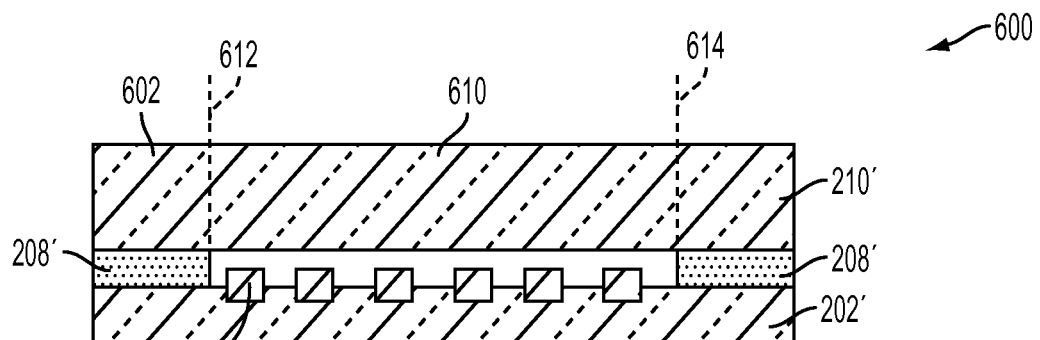

FIG. 6F is a cross-sectional view of second structure 600 following operation 510 in accordance with one or more embodiments. In some embodiments, base film 602 is cut at first cut region 612 or second cut region 614. Base film 602 includes region 610 and remaining base film 210'. In some embodiments, first cut region 612 or second cut region 614 is substantially orthogonal to the top surface of second substrate 202'. In some embodiments, first cut region 612 is substantially parallel to second cut region 614. In some embodiments, region 610 is a central portion of the base film 602.

Figure 6G:
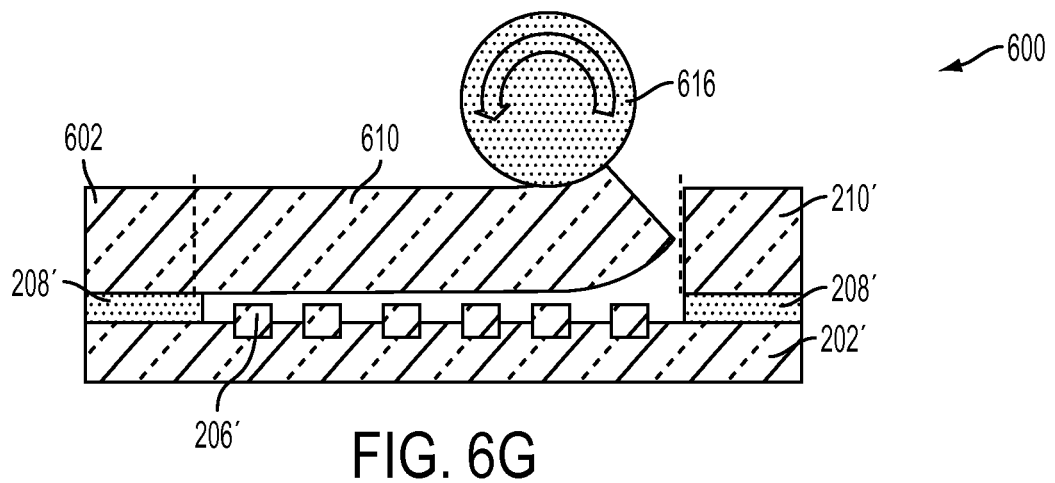

FIG. 6G is a cross-sectional view of second structure 600 during operation 512 in accordance with one or more embodiments. As shown in FIG. 6G, region 610 is removed from second structure 600 by a removal device 616. In some embodiments, removal device 616 includes a de-laminator. In some embodiments, removal device 616 includes an adhesive material formed on a surface of a cylindrically-shaped rod which is rolled along the top surface of region 610 to remove region 610 from base film 602. In some embodiments, removal device 616 includes an adhesive material (or other suitable materials) which is used to remove region 610 from base film 602.

Figure 6H:
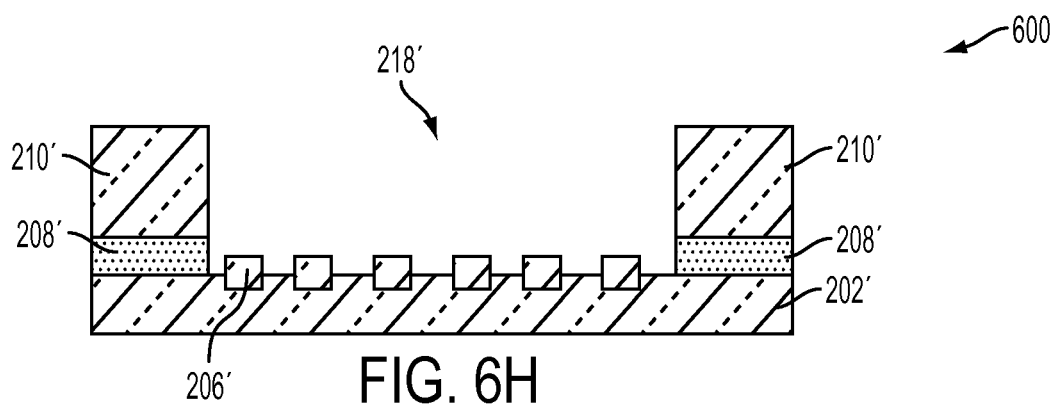

FIG. 6H is a cross-sectional view of second structure 600 following operation 512 in accordance with one or more embodiments. As shown in FIG. 6H, channel region 218' is formed by the removal of region 610 from second structure 600. In some embodiments, after region 610 of the base film 602 is removed, base film 210' remains attached to the second substrate 202'.

Figure 6I:
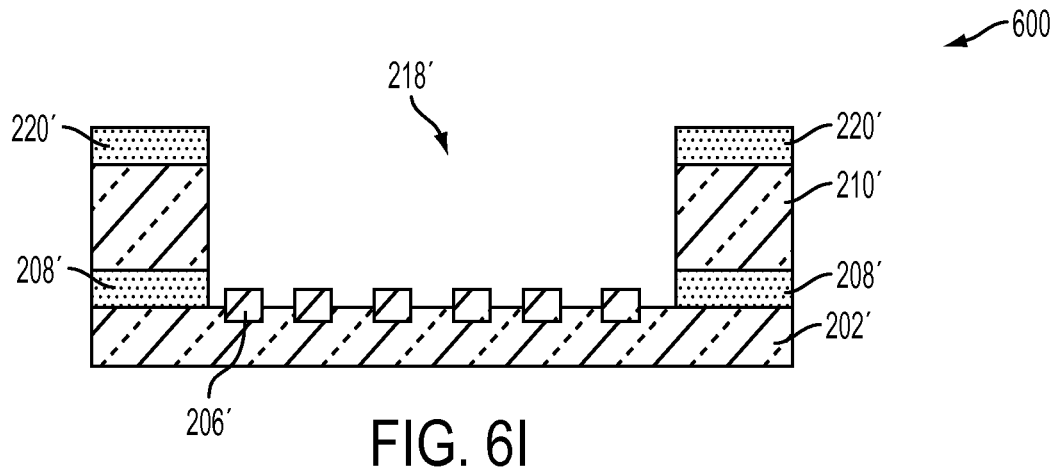

FIG. 6I is a cross-sectional view of second structure 600 following operation 514 in accordance with one or more embodiments. Second structure 600 includes third glue layer 220' formed on base film 210'. Second structure 600 is an embodiment of second structure 200' shown in FIG. 2B with similar elements.

Figure 7A:
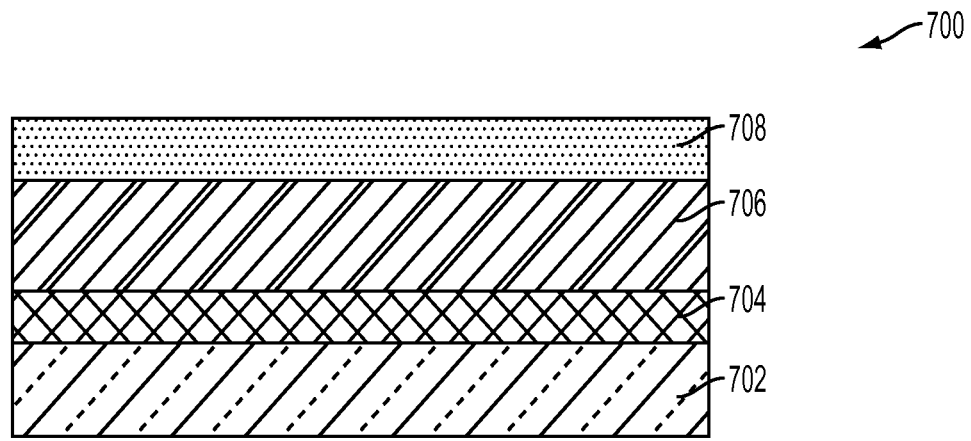
FIGS. 7A-7B are cross-sectional views of a third structure in accordance with one or more embodiments.

FIG. 7A is a cross-sectional view of a third structure 700 in accordance with one or more embodiments. In some embodiments, third structure 700 is a double-sided adhesive structure. Third structure 700 includes a first liner 702, a first adhesive layer 704, a base film 706 and a second adhesive layer 708. In some embodiments, third structure is a double-sided adhesive structure manufactured by 3M™.

First liner 702 is attached to a surface of first adhesive layer 704. In some embodiments, first liner 702 is a protective layer which prevents the first adhesive layer 704 from adhering to unwanted surfaces.

First adhesive layer 704 is positioned above first liner 702. In some embodiments, first adhesive layer 704 is positioned in a two-dimensional plane which is parallel to first liner 702. In some embodiments, first adhesive layer 704 includes an adhesive resin (including Epoxy, glue polyimide/rubber based glues, acrylic-based glues, silicone-based glues, epoxy-based polymer/resin or other suitable materials).

Base film 706 is positioned above first adhesive layer 704. Base film 706 is an embodiment of base film 602 with similar elements. In some embodiments, base film 706 is positioned in a two-dimensional plane which is parallel to first adhesive layer 704.

Second adhesive layer 708 is positioned above base film 706. In some embodiments, second adhesive layer 708 is positioned in a two-dimensional plane which is parallel to base film 706. In some embodiments, second adhesive layer 708 includes an adhesive resin (including Epoxy, glue polyimide/rubber based glues, acrylic-based glues, silicone-based glues, epoxy-based polymer/resin or other suitable materials). In some embodiments, a thickness of the base film 706, first adhesive layer 704 and second adhesive layer 708 ranges from about 10 μm to about 1 mm. In some embodiments, base film 210' is alkali-resistant at pH 11 or greater. In some embodiments, base film 210' is bio-compatible/friendly. In some embodiments, base film 210' is not soluble in water or an alcohol base solution.

Figure 7B:
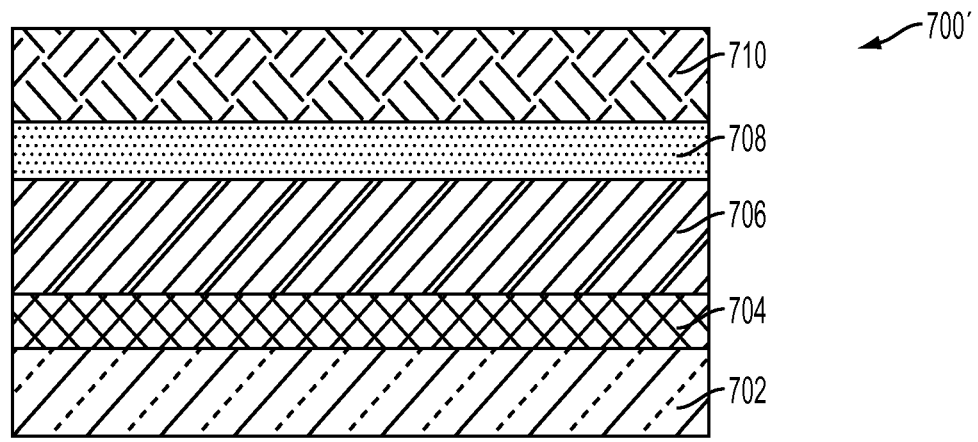

FIG. 7B is a cross-sectional view of a third structure 700' in accordance with one or more embodiments. Third structure 700' is an embodiment of third structure 700' with similar elements. As shown in FIG. 7B, similar elements have a same reference number as shown in FIG. 7A.

In comparison with third structure 700, third structure 700' further includes a second liner 710 formed on the surface of second adhesive layer 708. Second liner 710 is positioned above second adhesive layer 708. In some embodiments, second liner 710 is positioned in a two-dimensional plane which is parallel to second adhesive layer 708. In some embodiments, third structure 700' is a double-sided adhesive structure. In some embodiments, second liner 710 is a protective layer which prevents the second adhesive layer 708 from adhering to unwanted surfaces.

Figure 8:
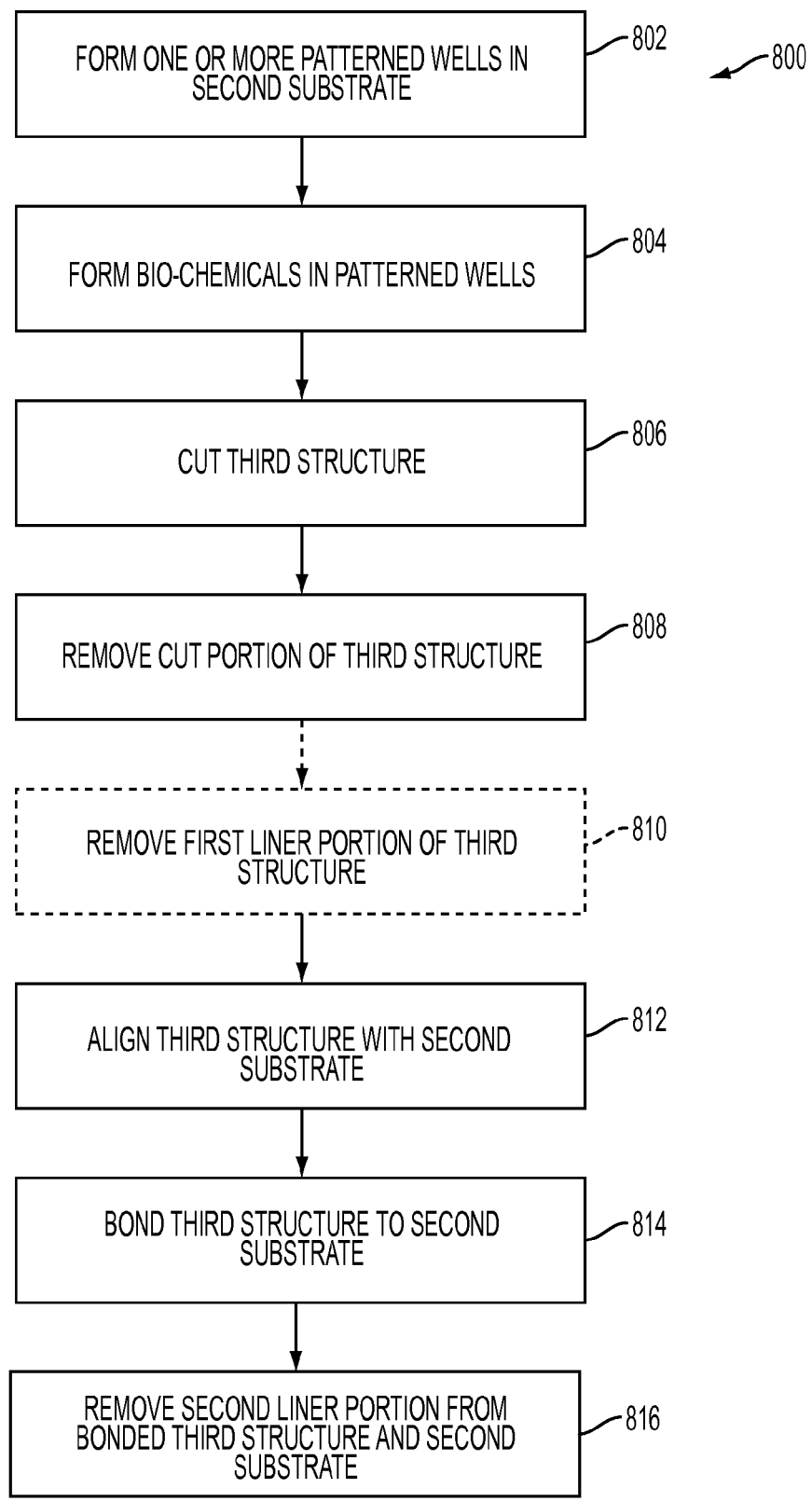
FIG. 8 is a flow chart of a method of making a second structure in accordance with one or more embodiments.

FIG. 8 is a flow chart of method 800 of making a second structure 900 in accordance with one or more embodiments. Second structure 900 is an embodiment of second structure 200'. Third structure 900' is an embodiment of third structure 700'. Method 800 is another embodiment of forming second structure 200'. Method 800 begins with operation 802 in which one or more patterned wells 904 (shown in FIG. 9B) are formed in a second substrate 202'. Patterned wells 904 are an embodiment of the patterned wells 404 shown in FIG. 4B.

Method 800 continues with operation 804 in which bio-chemicals 206' are formed in patterned wells 904. In some embodiments, bio-chemicals 206' are placed in patterned wells 604 by Illumina BeadArray Technology™. In some embodiments, bio-chemicals 206' are placed in patterned wells 604 by 454 Sequencing™. In some embodiments, bio-chemicals 206' completely fill each of the openings in patterned wells 904. In some embodiments, bio-chemicals 206' partially fill each of the openings in patterned wells 904. In some embodiments, bio-chemicals 206' are partially embedded in second substrate 202'. In some embodiments, bio-chemicals 206' are substantially similar to the bio-chemicals 206 formed in patterned wells 404.

Method 800 continues with operation 806 in which the third structure 900' is cut in one or more regions. In some embodiments, third structure 900' is cut at first cut region 912 or second cut region 914. In some embodiments, after third structure 900' is cut, a region 910 (shown in FIG. 9D) of third structure 900' is formed. In some embodiments, region 910 is a central portion of the third structure 900'. In some embodiments, first cut region 912 or second cut region 914 is substantially orthogonal to first liner 702. In some embodiments, first cut region 912 is substantially parallel to second cut region 914. In some embodiments, third structure 900' is cut using a punch cutting process. In some embodiments, third structure 900' is cut using a laser cutting process. In some embodiments, the laser cutting process includes a scribe width of about 10 μm with a low heat affect zone for a cut region with a thickness of about 25 μm. In some embodiments, the laser cutting process includes a scribe width of about 90 μm with a heat affect zone of about 100 μm for a cut region with a thickness of about 300 μm. In some embodiments, the laser cutting process includes a Fluorine 2 (F2) laser having a wavelength of about 157 nm. In some embodiments, the laser cutting process includes an Argon Fluoride (ArF) laser having a wavelength of about 193 nm. In some embodiments, the laser cutting process includes a Krypton Fluoride (KrF) laser having a wavelength of about 248 nm. In some embodiments, the laser cutting process includes a Xenon monoChloride (XeCl) laser having a wavelength of about 308 nm. In some embodiments, the laser cutting process includes a Xenon Fluoride (XeF) laser having a wavelength of about 351 nm.

Method 800 continues with operation 808 in which a portion of the third structure 900' is removed. In some embodiments, region 910 of the third structure 900' is removed by a removal device 916 (shown in FIG. 9F). In some embodiments, after region 910 is removed, channel region 920 is formed. In some embodiments, removal device 916 includes a punching device. In some embodiments, removal device 916 includes a de-laminator. In some embodiments, removal device 916 includes an adhesive material formed on a surface of a cylindrically-shaped rod which is rolled along the surface of region 910 to remove region 910 from third structure 900'. In some embodiments, removal device 916 includes an adhesive material (or other suitable materials) which is used to remove region 910 from third structure 900'.

Method 800 continues with operation 810 in which a portion of the first liner 710 is removed. In some embodiments, first liner 710 is removed by a removal device 918 (shown in FIG. 9H). In some embodiments, removal device 918 includes a de-laminator. In some embodiments, removal device 918 includes an adhesive material formed on a surface of a cylindrically-shaped rod which is rolled along the top surface of first liner 710 to remove the first liner 710 from third structure 900'. In some embodiments, removal device 918 includes an adhesive material (or other suitable materials) which is used to the first liner 710 from third structure 900'. In some embodiments, removal of the first liner 710 is optional; e.g., when an embodiment of the third structure 700 is used in method 800.

Figure 9A:
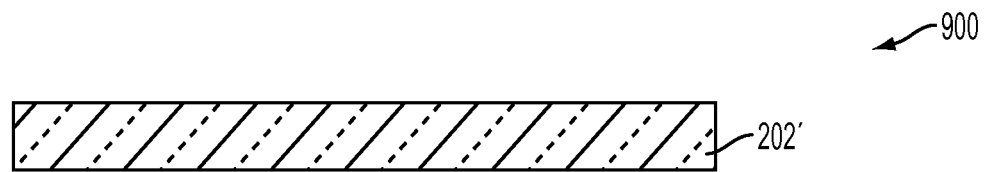
FIGS. 9A-9L are cross sectional views of a second structure during various stages of production in accordance with one or more embodiments.
Figure 9B:
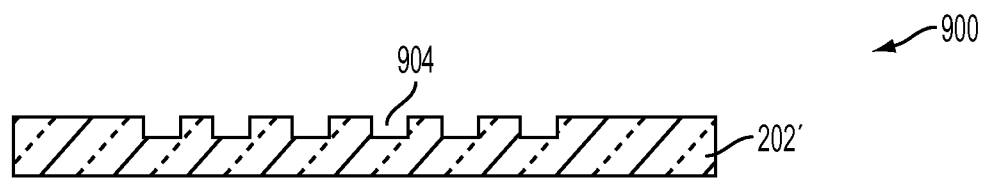
Figure 9C:
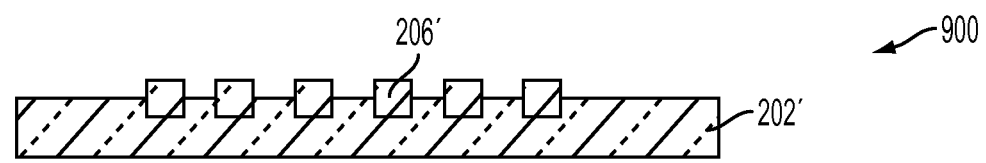
Figure 9D:
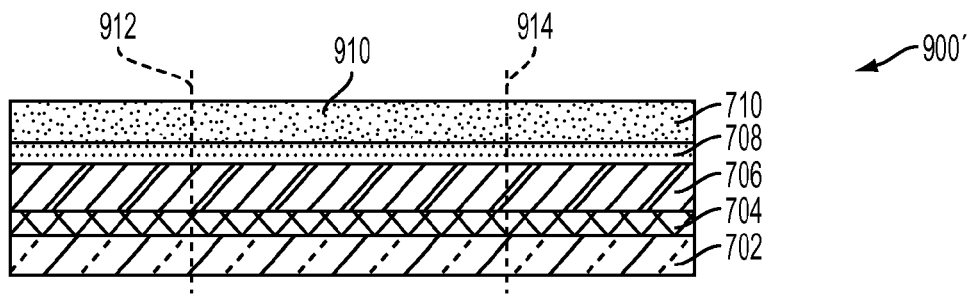
Figure 9E:
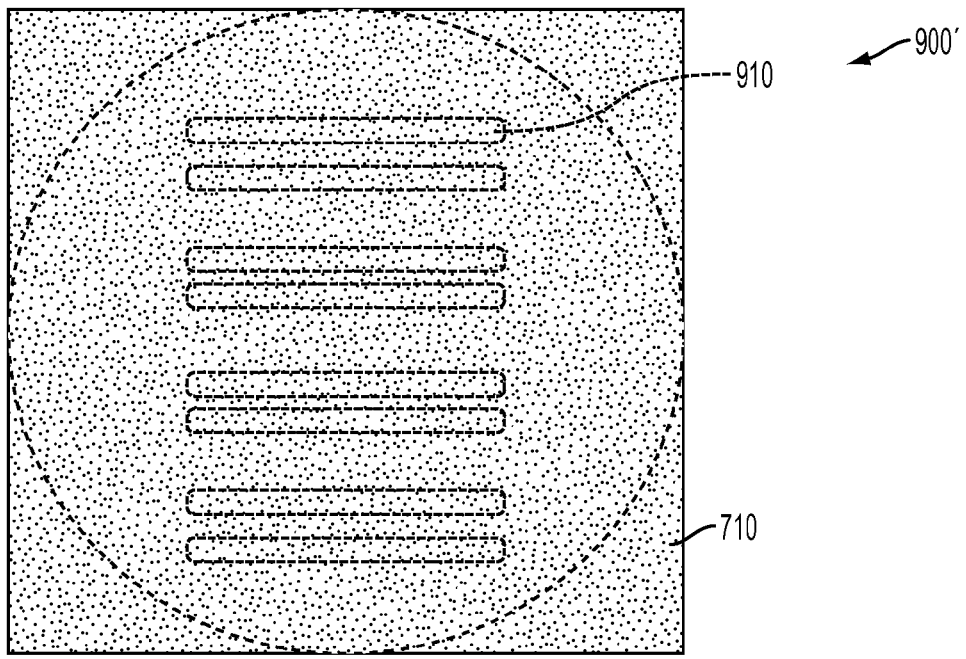
Figure 9F:
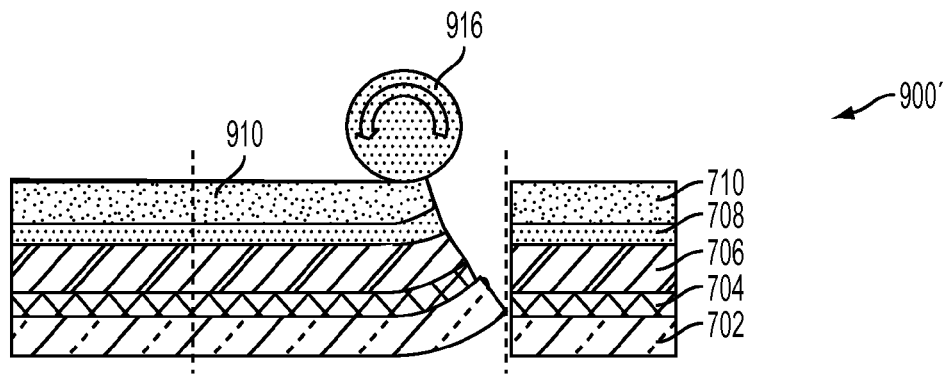
Figure 9G:
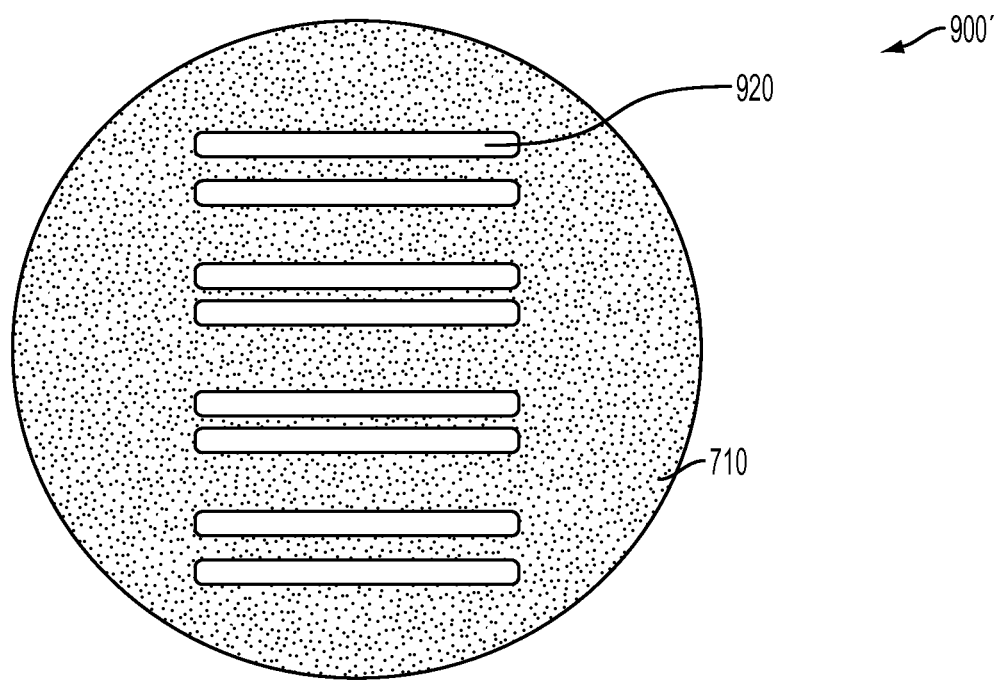
Figure 9H:
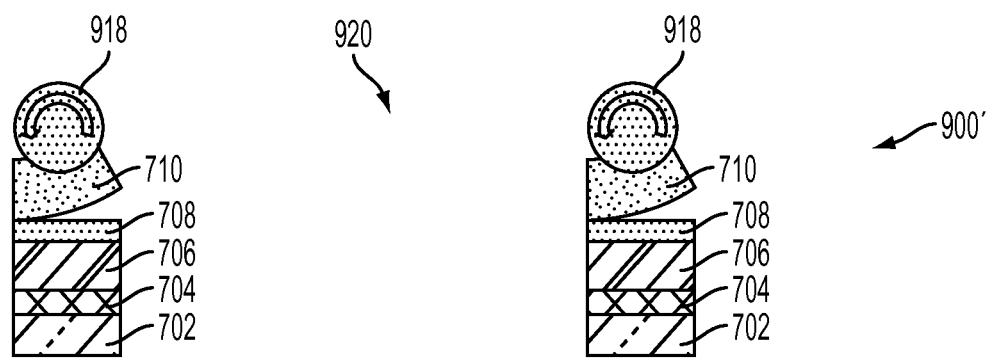
Figure 9I:
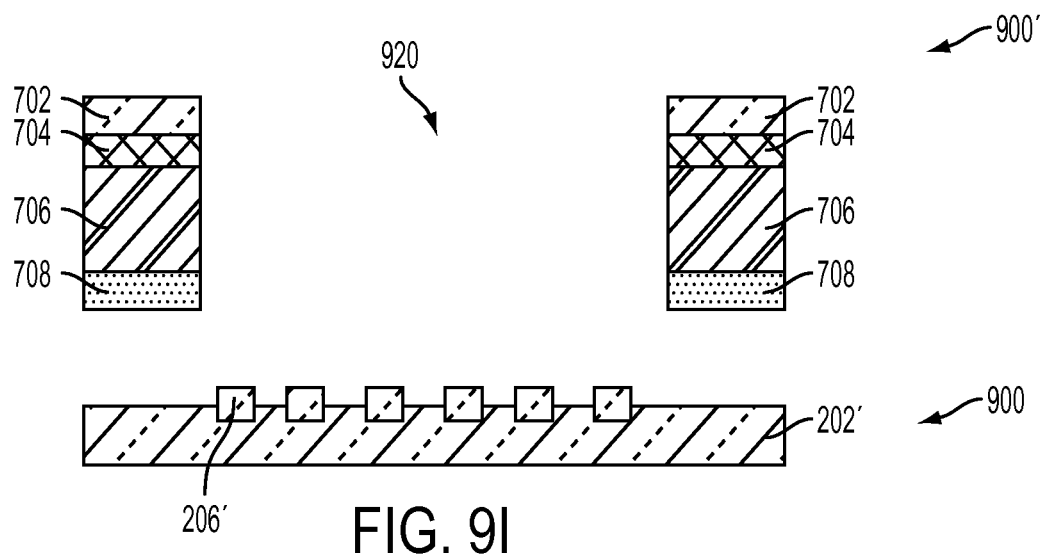

Method 800 continues with operation 812 in the third structure 900' is aligned with second structure 900 (as shown in FIG. 9I). In some embodiments, the third structure 900' is aligned with the second structure 900 using alignment marks formed on the second structure 900 or third structure 900'.

Figure 9J:
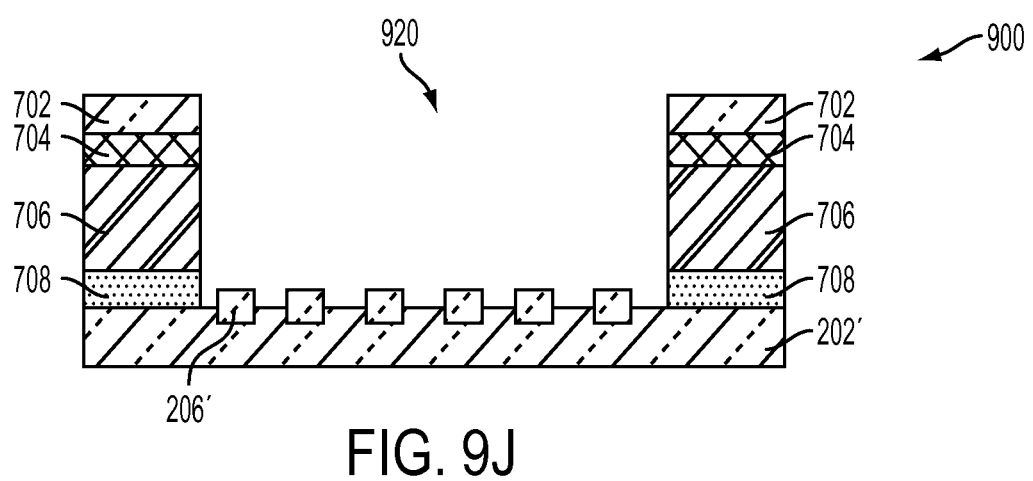

Method 800 continues with operation 814 in which the third structure 900' is bonded to the second structure 900 (shown in FIG. 9J). In some embodiments, the third structure 900' is bonded to the second structure 900 using first adhesive layer 707 or second adhesive layer 708.

Method 800 continues with operation 816 in which a portion of the second liner 702 is removed. In some embodiments, second liner 702 is removed by a removal device 918 (shown in FIG. 9K). In some embodiments, removal device 918 includes a de-laminator. In some embodiments, removal device 918 includes an adhesive material formed on a surface of a cylindrically-shaped rod which is rolled along the top surface of second liner 702 to remove the second liner 702 from third structure 900'/second structure 900. In some embodiments, removal device 918 includes an adhesive material (or other suitable materials) which is used to the second liner 702 from third structure 900'/second structure 900.

FIG. 9A is a cross-sectional view of a second structure 900 before operation 802 in accordance with one or more embodiments. Second structure 900 is an embodiment of second structure 200' with similar elements. As shown in FIG. 9A, similar elements have a same reference number as shown in FIG. 2B. Third structure 900' is an embodiment of third structure 700'. As shown in FIG. 9A, similar elements have a same reference number as shown in FIG. 7B.

FIG. 9B is a cross-sectional view of second structure 900 following operation 802 in accordance with one or more embodiments. Second structure 900 includes one or more patterned wells 904 formed in an upper surface of the second substrate 202'.

FIG. 9C is a cross-sectional view of second structure 900 following operation 804 in accordance with one or more embodiments. Second structure 900 includes one or more bio-chemicals 206' formed in patterned wells 904.

FIG. 9D is a cross-sectional view of third structure 900' following operation 806 in accordance with one or more embodiments. In some embodiments, third structure 900' is cut at first cut region 912 or second cut region 914. In some embodiments, first cut region 912 or second cut region 914 is substantially orthogonal to the top surface of third structure 900'. In some embodiments, first cut region 912 is substantially parallel to second cut region 914. In some embodiments, region 910 is a central portion of the third structure 900'.

FIG. 9E is a top view of the third structure 900' shown in FIG. 9D in accordance with one or more embodiments.

FIG. 9F is a cross-sectional view of third structure 900' during operation 808 in accordance with one or more embodiments. As shown in FIG. 9F, region 910 is removed from third structure 900' by a removal device 916.

FIG. 9G is a top view of the third structure 900' shown in FIG. 9H in accordance with one or more embodiments.

FIG. 9H is a cross-sectional view of third structure 900' during operation 810 in accordance with one or more embodiments. As shown in FIG. 9H, first liner 910 is removed from third structure 900' by a removal device 918.

FIG. 9I is a cross-sectional view of third structure 900' and second structure 900 during operation 812 in accordance with one or more embodiments. As shown in FIG. 9I, third structure 900' is aligned with second structure 900.

FIG. 9J is a cross-sectional view of third structure 900' and second structure 900 during operation 814 in accordance with one or more embodiments. As shown in FIG. 9J, third structure 900' is bonded with second structure 900.

Figure 9K:
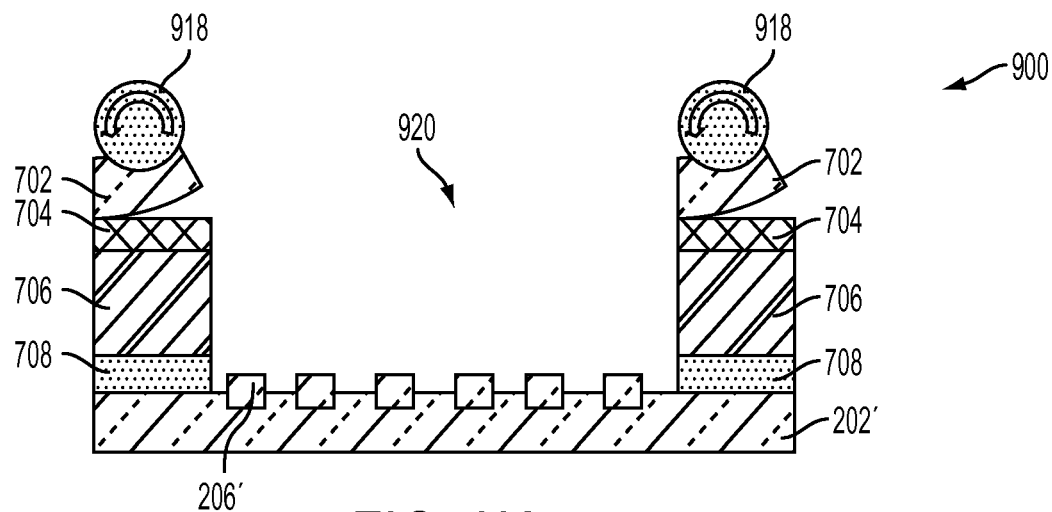

FIG. 9K is a cross-sectional view of third structure 900' and second structure 900 during operation 816 in accordance with one or more embodiments. As shown in FIG. 9K, second liner 702 is removed from third structure 900' by a removal device 918.

Figure 9L:
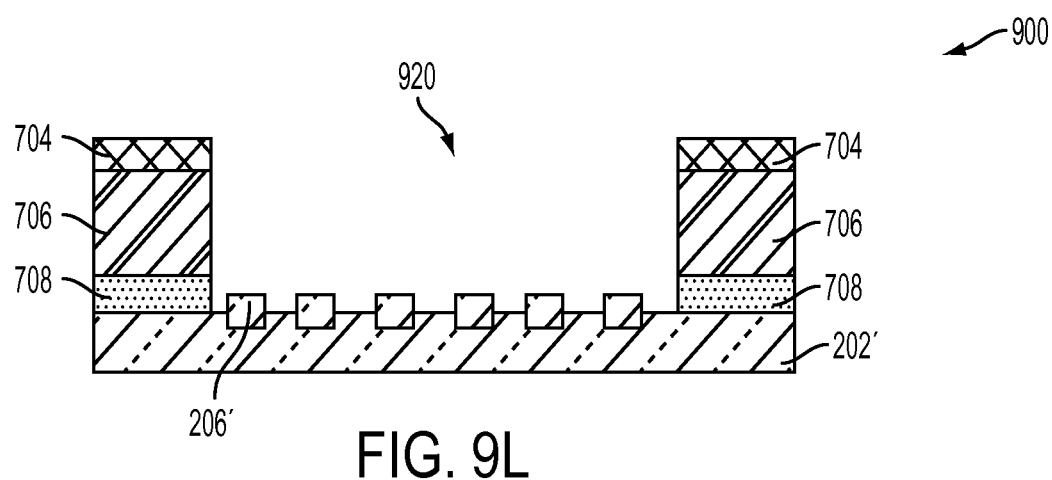

FIG. 9L is a cross-sectional view of third structure 900' and second structure 900 after operation 816 in accordance with one or more embodiments.

In some embodiments, one of ordinary skill in the art would recognize that method 100 can form device 250 having a channel region 216' without the need for photolithography and adhesive bonding. In some embodiments, one of ordinary skill in the art would recognize that method 100 can form device 250 with better chemical compatibility since the use of harsh chemicals contacting the bio-chemicals 206, 206' is reduced. In some embodiments, one of ordinary skill in the art would recognize that method 100 can form device 250 with improved properties of bio-chemicals 206, 206'. In some embodiments, one of ordinary skill in the art would recognize that method 100 can form device 250 having a channel region 218' with a wider range of thicknesses since the laser cutting process can be controlled and allow for a more steep vertical channel sidewall profile. In some embodiments, one of ordinary skill in the art would recognize that method 100 can form device 250 using a lower temperature bonding process such that the bio-chemicals 206, 206' are not damaged by the lower temperature process. In some embodiments, one of ordinary skill in the art would recognize that method 100 can form device 250 with a non-transparent first substrate 202 (e.g., silicon substrate) without a laser curing process, as opposed to a transparent substrate with a laser curing process. In some embodiments, one of ordinary skill in the art would recognize that method 100 can form device 250 with improved adhesive selectivity and a de-laminator can be used to remove cut base films with improved manufacturing efficiency.

One of ordinary skill in the art would recognize that an order of operations in methods 100, 300, 500 or 700 are adjustable. One of ordinary skill in the art would further recognize that additional steps are able to be included in any of methods 100, 300, 500 or 700 without departing from the scope of this description.

One aspect of this description relates to a method of making a flowcell structure, the method comprising forming a first structure, forming a second structure and bonding the first structure to the second structure. Further, forming the first structure comprises forming one or more first bio-chemicals in a first substrate and printing a first glue layer on the first substrate. Forming the second structure comprises forming one or more second bio-chemicals in a second substrate.

Another aspect of this description relates to a method of making a flowcell structure, the method comprising forming a first structure, forming a second structure and bonding the first structure to the second structure. Further, forming the first structure comprises forming one or more first bio-chemicals in a first substrate and forming a first opening in the first substrate. Also, forming the second structure comprises forming one or more second bio-chemicals in a second substrate.

Still another aspect of this description relates to a method of making a flowcell structure, the method comprising forming a first structure, forming a second structure, and bonding the first structure to the second structure. Further, bonding the first structure to the second structure comprises a bonding operating temperature less than or equal to 100 degrees Celsius. Also, forming the first structure comprises forming one or more first bio-chemicals in a first substrate and forming a first opening and a second opening in the first substrate. Further, forming the second structure comprises forming one or more second bio-chemicals in a second substrate.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of making a flowcell structure, the method comprising:
   forming a first structure, wherein forming the first structure comprises:
      forming one or more first bio-chemicals in a first substrate; and
      printing a first glue layer on the first substrate;
   forming a second structure, wherein forming the second structure comprises forming one or more second bio-chemicals in a second substrate; and
   bonding the first structure to the second structure.

2. The method of claim 1, wherein forming one or more first bio-chemicals in the first substrate comprises:
   forming one or more patterned wells in the first substrate; and
   forming one or more first bio-chemicals in the patterned wells.

3. The method of claim 1, further comprising forming a first opening in the first substrate.

4. The method of claim 3, wherein forming the first opening in the first substrate comprises a laser drilling process.

5. The method of claim 1, wherein forming the second structure further comprises printing a second glue layer on the second substrate.

6. The method of claim 1, wherein forming one or more second bio-chemicals in the second substrate comprises:
   forming one or more patterned wells in the second substrate; and
   forming one or more second bio-chemicals in the patterned wells.

7. The method of claim 5, further comprising placing a base film on the second glue layer.

8. The method of claim 7, further comprising:
   cutting the base film; and
   removing a portion of the base film.

9. The method of claim 7, further comprising forming a third glue layer on the base film.

10. The method of claim 1, wherein bonding the first structure to the second structure comprises a bonding operating temperature less than or equal to 100 degrees Celsius.

11. A method of making a flowcell structure, the method comprising:
    forming a first structure, wherein forming the first structure comprises:
       forming one or more first bio-chemicals in a first substrate; and
       forming a first opening in the first substrate;
    forming a second structure, wherein forming the second structure comprises forming one or more second bio-chemicals in a second substrate; and
    bonding the first structure to the second structure.

12. The method of claim 11, wherein forming one or more second bio-chemicals in the second substrate comprises:
    forming one or more patterned wells in the second substrate; and
    forming one or more second bio-chemicals in the patterned wells.

13. The method of claim 11, further comprising:
    cutting a third structure, wherein the third structure comprises:
       a base film between a first adhesive layer and a second adhesive layer;
       a liner portion on the first adhesive layer or the second adhesive layer; and
    removing a portion of the third structure.

14. The method of claim 13, further comprising removing the liner portion from the third structure.

15. The method of claim 14, further comprising:
    aligning the third structure with the second substrate; and
    bonding the third structure to the second substrate.

16. The method of claim 11, wherein bonding the first structure to the second structure comprises a bonding operating temperature less than or equal to 100 degrees Celsius.

17. The method of claim 11, wherein bonding the first structure to the second structure comprises a bonding operating temperature ranging from about 50 degrees Celsius to about 100 degrees Celsius.

18. A method of making a flowcell structure, the method comprising:
    forming a first structure, wherein forming the first structure comprises:
       forming one or more first bio-chemicals in a first substrate; and
       forming a first opening and a second opening in the first substrate;
    forming a second structure, wherein forming the second structure comprises forming one or more second bio-chemicals in a second substrate; and
    bonding the first structure to the second structure, wherein bonding the first structure to the second structure comprises a bonding operating temperature less than or equal to 100 degrees Celsius.

19. The method of claim 18, wherein the bonding operating temperature ranges from about 50 degrees Celsius to about 100 degrees Celsius.

20. The method of claim 18, further comprising:
    cutting a base film, wherein the base film is between a first adhesive layer and a second adhesive layer; and
    placing the base film on the second structure.

* * * * *